United States Patent [19]

Atkins, Sr.

[11] Patent Number: 4,703,736

[45] Date of Patent: Nov. 3, 1987

[54] FUEL VAPOR CONTAINMENT DEVICE

[75] Inventor: Walter J. Atkins, Sr., Wayne, Mich.

[73] Assignee: Chrysler Motors Corporation, Highland Park, Mich.

[21] Appl. No.: 911,544

[22] Filed: Sep. 25, 1986

[51] Int. Cl.[4] .................... B01D 53/04; F02M 39/00

[52] U.S. Cl. .................................. 123/519; 55/387; 123/516

[58] Field of Search ............... 123/516, 518, 519, 520, 123/521; 55/387, 58, 189

[56] References Cited

U.S. PATENT DOCUMENTS

| | | | |
|---|---|---|---|
| 4,070,828 | 1/1978 | Barres | 123/521 |
| 4,338,106 | 7/1982 | Mizuno | 123/519 |
| 4,364,753 | 12/1982 | Wagner | 55/387 |
| 4,504,289 | 3/1985 | Waller | 55/387 |
| 4,507,132 | 3/1985 | Yoshida | 123/519 |
| 4,548,624 | 10/1985 | Waller | 55/387 |
| 4,901,447 | 8/1983 | Hober | 55/387 |

FOREIGN PATENT DOCUMENTS

| | | | |
|---|---|---|---|
| 0165757 | 12/1981 | Japan | 123/518 |

*Primary Examiner*—Carl Stuart Miller
*Attorney, Agent, or Firm*—Kenneth H. MacLean, Jr.

[57] ABSTRACT

In an engine with an evaporative emission control system, a fuel vapor storage device adapted to receive and store vaporous fuel until subsequently purged with air passing through the storage medium therein. The subject device is constructed to more effectively receive and store fuel vapor and to be more effectively purged thereafter.

3 Claims, 3 Drawing Figures

FUEL VAPOR CONTAINMENT DEVICE

BACKGROUND OF THE INVENTION

The use of vapor storage devices, particularly in vehicles, to control fuel evaporation has been utilized previously. A typical fuel vapor storage device consists of a container holding a quantity of activated charcoal or the like which is the preferred medium for storing fuel vapors. Because the storage capacity of a given quantity of charcoal is limited, it is necessary to periodically purge the vapor storage device with fresh air to remove fuel vapor and pass it to an operating engine for subsequent treatment by other control devices, such as a catalytic converter. Normally, this purging occurs when the engine is operating at a moderate load and speed.

Typical vapor storage devices are disclosed in U.S. Pat. Nos. 4,134,378; 4,137,882 and 4,280,466. These devices share a common construction in that they utilize a generally cylindrical enclosure which is at least partially filled with a vapor storage medium such as activated charcoal. However, these patents disclose a charge of activated charcoal in a generally cylindrical configuration. An inlet for fuel vapor and an inlet for purging air is located centrally of the cylindrically shaped activated charcoal. Both when the fuel vapor enters the storage device and when air is drawn through the charcoal, the flow path of the vapor or air takes the form of a truncated cone through the activated charcoal with the small meeting in the vicinity of the central inlet. Thus, any activated charcoal outside the boundaries of this cone are rendered relatively ineffective both for storage of fuel vapor or for purging. It has been found that standard canisters of this aforedescribed description are generally only effectively purged by about 30 percent and, thus, their storage efficiency is quite low. The subject improved vapor storage device is believed to be effectively purged by as much as 90 percent of storage volume and, thus, the quantity of needed charcoal for storing fuel vapor is less, or conversely, much more is effectively utilized.

SUMMARY OF THE INVENTION

The aforedescribed prior devices have been shown to be relatively inefficient in storing fuel vapor and in being effectively regenerated by purge air. The subject improved vapor storage canister, by construction, produces a more efficient flow of fuel vapor substantially throughout the entire mass of the storage medium. The improved device also provides a more efficient flow of purged air through the storage medium thereby more effectively regenerating it for subsequent storage of more fuel vapor.

IN THE DRAWINGS

In FIG. 1, a typical prior art storage device is shown in somewhat schematic fashion;

FIG. 2 is an elevational sectioned view of the subject improved vapor storage device; and FIG. 3 is a planar sectioned view of the subject vapor storage device taken along section line 3—3 in FIG. 2 and looking in the direction of the arrows.

DETAILED DESCRIPTION OF AN EMBODIMENT

Figure 1:
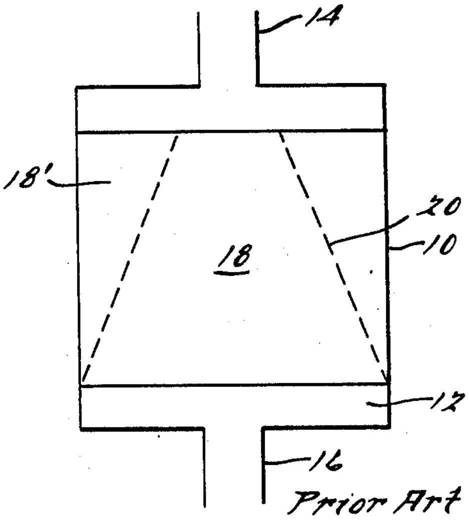

In FIG. 1, a prior art vapor storage device is shown with an enclosure 10 defining an interior space 12. The enclosure or housing 10 has an inlet means 14 centrally at one end and a second inlet means 16 centrally at another end. The inlet 14 is for the introduction of fuel vapors from a fuel tank or a carburetor bowl, for example. The inlet 16 is adapted to be connected to a source of air or vacuum, so as to produce an air flow through the interior of housing 10. The housing 10 supports a quantity of vapor storage medium, such as activated charcoal 18 as is known in the art. The activated charcoal 18 stores fuel vapor entering the interior of the housing 10 from the inlet 14. The broken lines 20 generally define the outer boundaries of an effective quantity of charcoal in the shape of a truncated cone. This portion is primarily responsible for storing fuel vapors passing from inlet 14. The quantity of storage medium 18' outside the boundaries of broken line 20 is progressively less effective in storing fuel vapor as the walls of enclosure 10 are approached. Likewise, a similarly shaped envelope of effective vapor storage medium is effectively purged by air flow through the medium to an inlet 16 during the purge portion of the cycle. Thus, a substantial portion of the vapor storage medium is relatively ineffective for storage and for purge.

Figure 2:
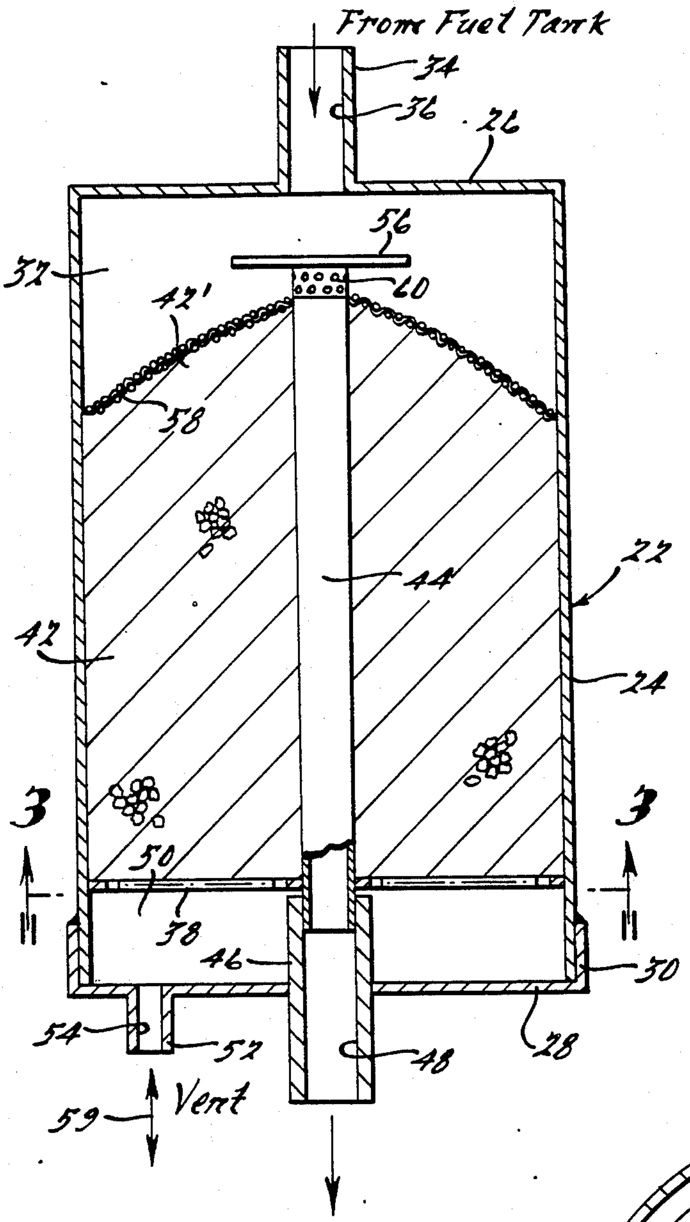
Figure 3:
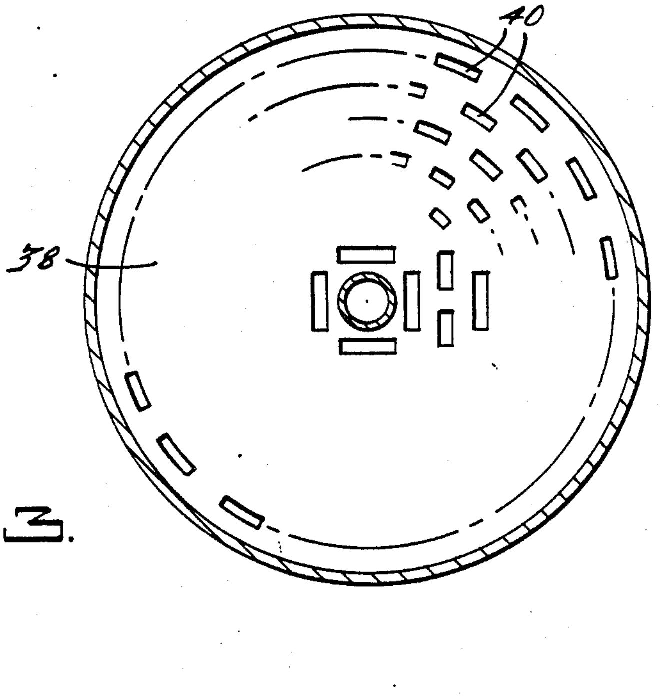

An improved vapor storage device is shown in FIG. 2 and FIG. 3. It includes a generally cylindrical housing or enclosure 22 with a cylindrical side wall portion 24 and upper end portion 26 and it is enclosed or covered by a lower end wall 28. The cover or end wall 28 includes an upstanding peripheral edge portion 30 which encircles the lower end of the side wall 24 and is attached thereto by adhesive, brazing, welding, or other suitable means. The housing 22 surrounds a generally cylindrical interior portion 32 to which a generally tubular inlet means 34 extends through the top wall 26. The inlet means 34 defines inlet passage 36 for flowing vaporous fuel to the interior 32 of the housing 22.

Housing 22 includes a partition wall means 38 which is interference fit at its peripheral edge against the interior of the wall 24. The partition 38 is also shown in FIG. 3 and has a large number of elongated openings 40 therethrough for allowing an uninhibited passage of fuel vapor and/or air through the wall 38. The wall 38 forms the bottom limits of a large portion of the interior 32 and, thus, the bottom enclosure for a quantity of activated charcoal or other vapor storage medium 42. The vapor storage medium 42 is in the form of relatively small particles. Accordingly, it is formable to a desired configuration. The storage medium 42 is best formed with its upper surface 42' thereof domed or conically formed as shown in FIG. 2. Resultantly, the mass of storage material will be more effectively utilized as will be discussed hereafter.

A tubular member 44 extends through the center of the storage medium 42. An upper end of member 44 extends above the domed surface 42'. A lower end extends through the midportion of the partition 38 where it is connected to an inlet passage means 46 extending through the bottom cover or wall 28. The inlet 46 defines a passage 48 which preferably is connected to a vacuum source so that an air flow can be drawn through the interior of the housing means 22 whenever purging is desired. For this purge function, a chamber 50 is formed between the wall 28 of housing 22 and the partition 38 for evenly distributing air to each of the apertures 40 in the partition member 38. An air inlet 52 is formed through the bottom wall 28 to define a passage 54 into the chamber 50. The inlet 52 is connected to a source of clean air, such as a vehicle air cleaner.

During a vapor storage portion of the emission cycle, fuel vapor may enter the inlet means 34. The vapor is distributed over the domed surface 42' of the activated charcoal medium 42 as directed disk 56 on the upper end of the tubular member 44. The fuel vapor passes into the activated charcoal 42 through the domed surface. This domed surface 42' presents a relatively large surface area as compared to a flat surface and also provides a better distribution of fuel vapors toward the edge and adjacent wall 24. In order to maintain the domed configuration 42', a screen means 58 encircles the upper end of the tubular member 44 and extends outward and downward to the wall means 24. As noted by the double ended arrow 59 located beneath the inlet 52, pressure in the interior of the housing 22 can be relieved thereby, thus promoting the saturation of the activated charcoal 42 with fuel.

During a regeneration or a purge portion of the emission cycle, a selectively applied or programmed vacuum is applied to the inlet 46 to produce airflow from the vent inlet means 52 and through the openings 40 in partition 38, hence through the vapor storage medium 42. The air then flows past screen 58 to the upper portion of the interior 32. Subsequently, the air and fuel vapor is drawn through a plurality of openings 60 in the upper end of the tube 44 located above the screen 58 and the level of the surface 42'. The air and fuel then flows downward through the tube 44 and outlet 46 to the vacuum source which typically is the intake manifold of a vehicle engine. The aforedescribed flow is designed to provide a relatively even purge flow through the mass of activated charcoal 42 so that effectively all of the charcoal is purged of fuel vapors thereby increasing the efficiency of the device to subsequently store fuel vapors.

Although only one embodiment of the improved vapor storage device has been described heretofore and shown in the drawings, it is obvious that other embodiments of the improved storage device are possible that still fall within the scope of the following claims which define the invention.

What is claimed is:

1. In a vehicle having an internal combustion engine and a fuel tank as sources of vacuum pressure and fuel vapor, respectively, an improved vapor storage apparatus comprising:

a hollow enclosure with top, bottom and side walls defining an interior and having an inlet connected to the source of fuel vapor, a vent inlet connected to a source of clean air and an outlet selectively connected to the vacuum pressure source when desired;

the inlet entering the interior of the enclosure through the top wall, the outlet and the vent inlet entering the interior through the bottom wall;

a perforate partition means spaced upward from the bottom wall forming an air chamber therebetween and fluidly connected to the vent aperture;

a quantity of vapor storage medium over the perforate partition means capable of conducting fluid flow therethrough;

a tubular conduit extending from the outlet and centrally through the partition means and the vapor storage medium and having openings to the housing interior positioned above the vapor storage medium;

the vapor storage medium being of moldable material with the upper surface thereof being formed into a dome-shaped configuration extending outward and downward from the central conduit thereby increasing the surface area for fuel vapor to enter the storage medium, whereby during a vapor storage mode, fuel vapor enters the housing through the inlet and is introduced to the vapor storage medium in a relatively uniform pattern due to the surface configuration of the medium as displaced air is discharged from the housing interior through the vent aperture, and whereby during a purge mode, the source of vacuum pressure is fluidly connected to the outlet and tubular conduit means to draw air into the air chamber below the perforate partition means and thereafter upward uniformly through the vapor storage medium.

2. The vapor storage device of claim 1 with the axes of the inlet and tubular conduit means being generally aligned, a deflector means on the upper end of the tubular conduit means and substantially normal to the axes to cause fuel vapor flow from the inlet to spread laterally and over the domed upper surface of the storage medium for uniform absorption therein.

3. The vapor storage device of claim 1 and with a perforate means overlying the domed upper surface of the surface medium to maintain the desired domed configuration thereof.

* * * * *